(12) United States Patent
Son et al.

(10) Patent No.: US 12,034,140 B2
(45) Date of Patent: Jul. 9, 2024

(54) BATTERY MODULE, BATTERY PACK COMPRISING SAME, AND VEHICLE

(71) Applicant: LG CHEM, LTD., Seoul (KR)

(72) Inventors: Sang-Il Son, Daejeon (KR); Ha-Neul Yoo, Daejeon (KR); Yun-Ki Choi, Daejeon (KR); Jong-Soo Ha, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 912 days.

(21) Appl. No.: 15/779,777

(22) PCT Filed: Jan. 16, 2017

(86) PCT No.: PCT/KR2017/000532
§ 371 (c)(1),
(2) Date: May 29, 2018

(87) PCT Pub. No.: WO2017/150802
PCT Pub. Date: Sep. 8, 2017

(65) Prior Publication Data
US 2019/0288357 A1    Sep. 19, 2019

(30) Foreign Application Priority Data

Mar. 3, 2016    (KR) .................. 10-2016-0025737

(51) Int. Cl.
*H01M 10/6568* (2014.01)
*B60L 50/64* (2019.01)
(Continued)

(52) U.S. Cl.
CPC ......... *H01M 10/6568* (2015.04); *B60L 50/64* (2019.02); *H01M 10/613* (2015.04);
(Continued)

(58) Field of Classification Search
None
See application file for complete search history.

(56) References Cited

U.S. PATENT DOCUMENTS

| 5,432,026 A | * | 7/1995 | Sahm | ............... B60L 58/26 |
| | | | | 429/120 |
| 2006/0115721 A1 | * | 6/2006 | Lee | ............... H01M 10/6563 |
| | | | | 429/156 |

(Continued)

FOREIGN PATENT DOCUMENTS

| CN | 101340012 A | 1/2009 |
| CN | 103066225 A | 4/2013 |

(Continued)

OTHER PUBLICATIONS

Machine translation of FR 3011131 (Jovet) (Year: 2015).*

(Continued)

*Primary Examiner* — Barbara L Gilliam
*Assistant Examiner* — Helen M McDermott
(74) *Attorney, Agent, or Firm* — Birch, Stewart, Kolasch & Birch, LLP

(57) ABSTRACT

According to an embodiment of the present disclosure, a battery module includes: a cartridge including an accommodation space therein; a plurality of battery cells placed in the accommodation space; a cooling unit configured to cool the battery cells; and a heat exchange unit configured to exchange heat with the cooling unit, wherein the heat exchange unit includes: a heat exchange chamber having an inner space; a lower cooling flow path located in the heat exchange chamber and through which a cooling fluid flows; an upper cooling flow path located above the lower cooling flow path and through which the cooling fluid supplied from the lower cooling flow path flows; and a connection flow (Continued)

path configured to supply the cooling fluid flowing in the lower cooling flow path to the upper cooling flow path.

12 Claims, 9 Drawing Sheets

(51) Int. Cl.
| | | |
|---|---|---|
| *H01M 10/613* | (2014.01) | |
| *H01M 10/617* | (2014.01) | |
| *H01M 10/625* | (2014.01) | |
| *H01M 10/647* | (2014.01) | |
| *H01M 10/6551* | (2014.01) | |
| *H01M 10/6554* | (2014.01) | |
| *H01M 10/6555* | (2014.01) | |
| *H01M 10/6556* | (2014.01) | |
| *H01M 50/211* | (2021.01) | |
| *H01M 50/249* | (2021.01) | |

(52) U.S. Cl.
CPC ....... *H01M 10/617* (2015.04); *H01M 10/625* (2015.04); *H01M 10/647* (2015.04); *H01M 10/6551* (2015.04); *H01M 10/6554* (2015.04); *H01M 10/6555* (2015.04); *H01M 10/6556* (2015.04); *H01M 50/211* (2021.01); *H01M 50/249* (2021.01); *H01M 2220/20* (2013.01); *Y02E 60/10* (2013.01); *Y02T 10/70* (2013.01)

(56) References Cited

U.S. PATENT DOCUMENTS

| | | |
|---|---|---|
| 2012/0298433 A1 | 11/2012 | Ohkura |
| 2013/0196207 A1* | 8/2013 | Zahn ................ H01M 10/6568 429/120 |
| 2014/0363710 A1 | 12/2014 | Lee et al. |
| 2015/0236385 A1 | 8/2015 | Park et al. |
| 2016/0099489 A1* | 4/2016 | Park .................... H01M 10/627 429/120 |
| 2016/0141737 A1 | 5/2016 | Kubota et al. |

FOREIGN PATENT DOCUMENTS

| | | |
|---|---|---|
| CN | 105284688 A | 1/2016 |
| DE | 102008034869 A1 | 6/2009 |
| FR | 3011131 A1 | 3/2015 |
| JP | 2013-125817 A | 8/2013 |
| KR | 10-2013-0061895 A | 6/2013 |
| KR | 10-2013-0080144 A | 7/2013 |
| KR | 10-2014-0039360 A | 4/2014 |
| KR | 10-2014-0056835 A | 5/2014 |
| KR | 10-2014-0077272 A | 6/2014 |
| KR | 10-2015-0096885 A | 8/2015 |

OTHER PUBLICATIONS

International Search Report for PCT/KR2017/000532 (PCT/ISA/210) dated Apr. 18, 2017.
English Tranlastion of the Notice of Reasons for Refusal dated Aug. 19, 2019 in Japanese Patent Application No. 2018-529583.
English Translation of Notification of Reason for Refusal dated Aug. 26, 2019 in Korean Patent Applicalton No. 10-2016-0025737.

* cited by examiner

BATTERY MODULE, BATTERY PACK COMPRISING SAME, AND VEHICLE

TECHNICAL FIELD

The present disclosure relates to a battery module including a battery cell, and a battery pack and a vehicle including the same, and more particularly, to a battery module capable of cooling a battery cell, and a battery pack and a vehicle including the same.

The present application claims priority to Korean Patent Application No. 10-2016-0025737 filed on Mar. 3, 2016 in the Republic of Korea, the disclosure of which is incorporated herein by reference.

BACKGROUND ART

Secondary batteries are highly applicable to various product groups and have electrical characteristics with high energy density. Such secondary batteries are applied not only to portable electronic devices but also to electric or hybrid vehicles driven by electrical driving sources, power storage devices, etc.

The use of secondary batteries can markedly reduce the consumption of fossil fuels, and in addition to this primary merit, secondary batteries do not generate any byproducts caused by energy consumption, thereby receiving much attention as a new energy source for improving environment friendliness and energy efficiency.

Battery packs applied to electric vehicles or the like have a structure in which a plurality of battery modules including a plurality of battery cells are connected to each other for high output power. In addition, each battery cell is an electrode assembly that can be repeatedly charged and discharged by electrochemical reaction between components including positive and negative electrode collectors, a separator, an active material, and an electrolyte.

In recent years, along with the increasing need for a large-capacity structure applicable as an energy storage device as well, there is increasing demand for battery packs having a multi-module structure formed by a plurality of battery modules in which a plurality of secondary batteries are connected in series and/or parallel.

Since battery packs having a multi-module structure are manufactured in such a manner that a plurality of secondary batteries are densely packed in a narrow space, it is important to easily discharge heat generated from each secondary battery. During the charging or discharging operation of a secondary cell battery, heat is generated as a result of electrochemical reaction. If heat is not efficiently dissipated from a battery module during charging and discharging operations, heat accumulation may occur. In addition, the battery module may deteriorate and in some cases may catch on fire or explode.

Therefore, a high-power, high-capacity battery module and a battery pack including the battery module must have a cooling device so as to cool battery cells included therein.

In general, there are two typical types of cooling devices: an air cooling type and a water cooling type. Due to problems such as a short circuit or making a secondary battery watertight, the air cooling type is more widely used than the water cooling type.

The power that can be produced by a single secondary battery cell is not so high, and thus in general a necessary number of battery cells are stacked and packaged in a module case of a commercial battery module. In addition, a plurality of cooling fins corresponding to the area of the battery cells are inserted as heat-dissipating members between the battery cells so as to dissipate heat generated while electricity is generated from each battery cell and thus to maintain a proper secondary battery temperature. The cooling fins absorbing heat from each battery cell are connected to a single cooling plate and transfer heat to the cooling plate. The cooling plate transfers heat received from the cooling fins to a heat exchange member, and the heat exchange member is cooled by cooling water or cooling air.

However, the heat exchange member forms a single flow path. A cooling fluid supplied from the single flow path exchanges heat with the cooling plate at an upstream side and proceeds downstream. However, as the cooling fluid flows from upstream to downstream, the temperature of the cooling fluid increases due to heat transferred from the cooling plate. Due to the increase in the temperature of the cooling fluid, as it goes downstream, the amount of heat absorbed from the cooling plate decreases compared to the amount of heat absorbed from an upstream side. Thus, there is a problem in that the cooling efficiency of a battery cell located above a downstream side of the heat exchange member is low.

DISCLOSURE

Technical Problem

The present disclosure is to provide a battery module capable of improving the cooling efficiency of a battery cell, and a battery pack and a vehicle including the same.

In addition, the present disclosure is to provide a battery module capable of maintaining a uniform temperature across regions of a battery cell when cooling the battery cell, and a battery pack and a vehicle including the same.

The present disclosure is not limited thereto, and other objects not mentioned above may be clearly understood by those of ordinary skill in the art from the following description.

Technical Solution

The present disclosure provides a battery module including a plurality of battery cells.

According to an embodiment of the present disclosure, a battery module may include: a cartridge including an accommodation space therein; a plurality of battery cells placed in the accommodation space; a cooling unit configured to cool the battery cells; and a heat exchange unit configured to exchange heat with the cooling unit, wherein the cooling unit may include: a cooling fin making surface contact with sides of the battery cells; and a cooling plate making contact with the cooling fin, wherein the heat exchange unit may include: a heat exchange chamber including an inner space; a lower cooling flow path located in the heat exchange chamber and through which a cooling fluid flows; an upper cooling flow path located above the lower cooling flow path and through which the cooling fluid supplied from the lower cooling flow path flows; and a connection flow path configured to supply the cooling fluid flowing in the lower cooling flow path to the upper cooling flow path.

According to an embodiment, the connection flow path may branch off from the lower cooling flow path and may be inclined upward with respect to a direction in which the cooling fluid flows.

According to an embodiment, the connection flow path may include a plurality of connection flow paths, and the connection flow paths adjacent to each other may be arranged in the heat exchange chamber at a predetermined distance from each other.

According to an embodiment, the heat exchange unit may further include: a supply pipe configured to supply the cooling fluid to the lower cooling flow path; and a discharge pipe configured to discharge the cooling fluid outward from the upper cooling flow path.

According to an embodiment, the inner space of the heat exchange chamber may include an upstream region adjacent to the supply pipe and a downstream region adjacent to the discharge pipe, and the number of connection flow paths located in the downstream region may be greater than the number of connection flow paths located in the upstream region.

According to an embodiment, the discharge pipe may be located higher than the supply pipe.

According to an embodiment, an area of the upper cooling flow path may be greater than an area of the cooling plate.

According to an embodiment, the upper cooling flow path and the lower cooling flow path may have the same area.

According to an embodiment, the heat exchange unit may include a plurality of heat exchange units, and supply pipes of the heat exchange units adjacent to each other may be positioned in opposite directions with respect to the heat exchange chamber.

According to an embodiment, the heat exchange unit may further include a temperature measuring member configured to inspect a temperature of the cooling fluid in the upper cooling flow path and the lower cooling flow path.

The present disclosure may provide a battery pack including the battery module.

The present disclosure may provide a vehicle including the battery pack.

Advantageous Effects

According to an embodiment of the present disclosure, the cooling plate may exchange heat with the heat exchange unit including the upper cooling flow path, the connection flow path, and the lower cooling flow path, thereby improving the cooling efficiency of the battery cells.

The effects of the present disclosure are not limited to the above-mentioned effect, and other effects not mentioned above may be clearly understood by those of ordinary skill in the art from the present specification and the accompanying drawings.

BEST MODE

Figure 1:
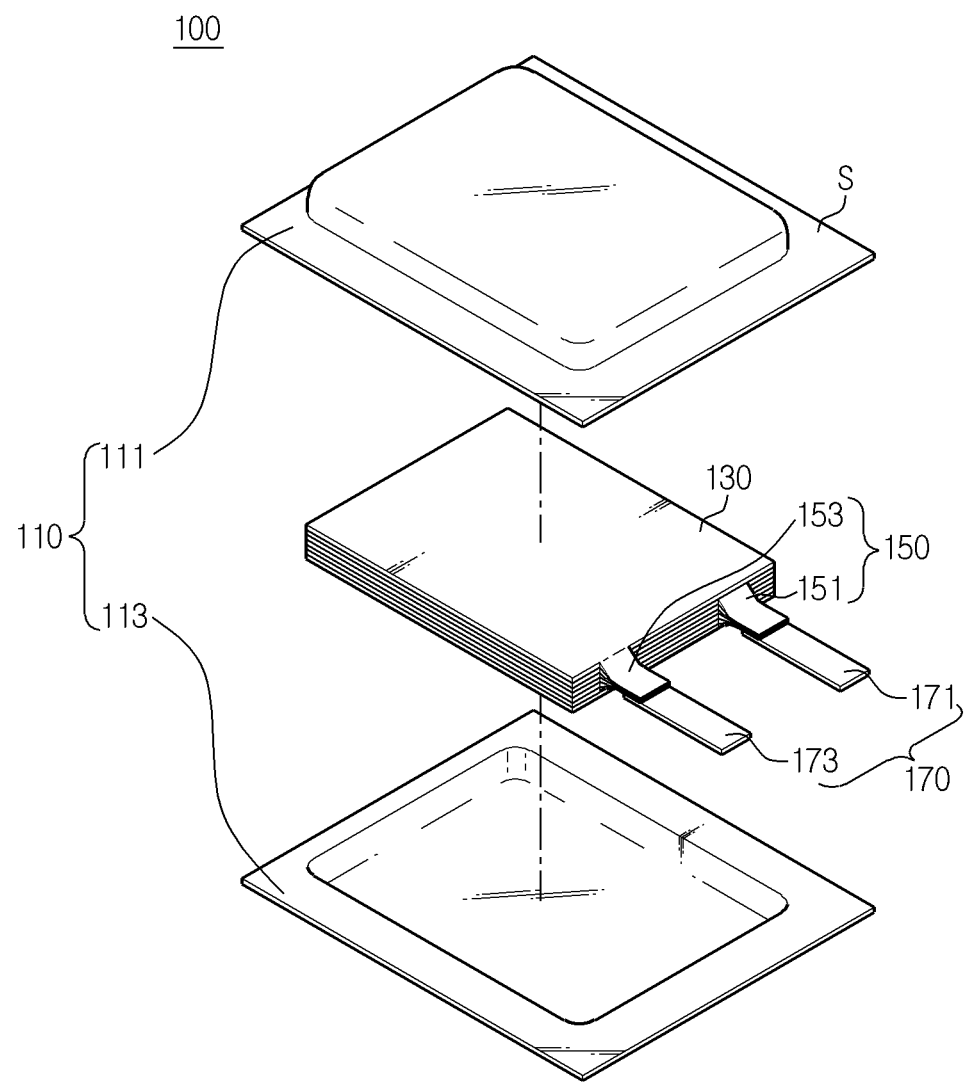
FIG. 1 is an exploded perspective view illustrating a configuration of a battery cell according to an embodiment of the present disclosure.

Hereinafter, embodiments of the present disclosure will be described in detail with reference to the accompanying drawings. The embodiments of the present disclosure may be modified in various forms, and the scope of the present disclosure should not be construed as being limited to the embodiments described below. These embodiments are provided to more fully explain the present disclosure to those of ordinary skill in the art.

Thus, in the drawings, the shapes of some elements may be exaggerated for clearer explanation and emphasis. In addition, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 2:
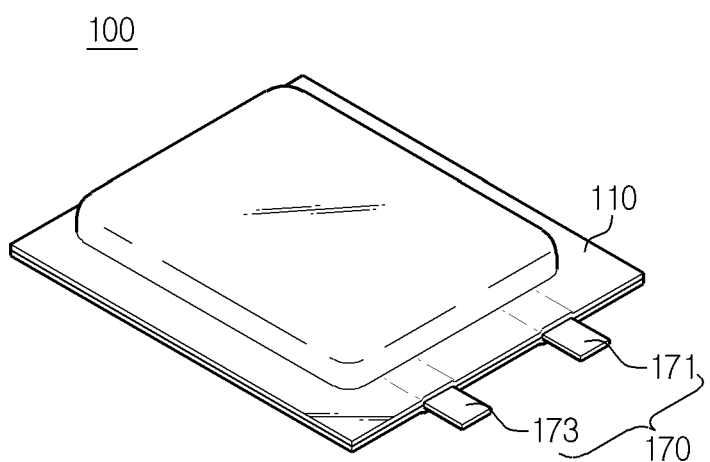
FIG. 2 is a perspective view illustrating the battery cell according to an embodiment of the present disclosure.

Before describing a battery module 10 of the present disclosure, a plurality of battery cells 100 included in the battery module 10 will be described first. In an embodiment of the present disclosure, a pouch-type battery cell 100 will be described as an example of secondary battery cells. FIG. 1 is an exploded perspective view illustrating a configuration of a battery cell according to an embodiment of the present disclosure, and FIG. 2 is a perspective view illustrating the battery cell according to an embodiment of the present disclosure. Referring to FIGS. 1 and 2, the battery cell includes a pouch case 110, an electrode assembly 130, an electrode tab 150, and an electrode lead 170.

The pouch case 110 has an inner space. The electrode assembly 130 and an electrolyte to be described later are placed inside the pouch case 110. A central region of the pouch case 110 protrudes in upward and downward directions. The pouch case 110 includes an upper case 111 and a lower case 113.

The upper case 111 and the lower case 113 are combined with each other to form the inner space. A central region of the upper case 111 has a concave shape protruding upward. The lower case 113 is placed under the upper case 111. A central portion of the lower case 113 has a concave shape protruding downward. Alternatively, the inner space of the pouch case 110 may be formed in only one of the upper case 111 and the lower case 113.

The upper case 111 and the lower case 113 have sealing portions S, respectively. The sealing portion S of the upper case 111 and the sealing portion S of the lower case 113 may be provided in a mutually-facing manner. The sealing portion S of the upper case 111 and the sealing portion S of the lower case 113 may be bonded to each other by thermally fusing inner adhesive layers provided on inner sides of the sealing portions S to each other. The inner space may be sealed by bonding the sealing portions S to each other.

The electrolyte and the electrode assembly 130 are accommodated in the inner space of the pouch case 110. The pouch case 110 may include an outer insulating layer, a metal layer, and an inner adhesive layer. The outer insulating layer may prevent permeation of external moisture, gas, or the like. The metal layer may improve the mechanical strength of the pouch case 110. The metal layer may be formed of aluminum. Alternatively, the metal layer may be formed of any one selected from an alloy of iron, carbon, chromium, and manganese; iron, nickel, and an alloy of nickel; aluminum; and an equivalent thereof. If the metal layer is formed of a material containing iron, mechanical strength may be increased. If the metal layer is formed of an aluminum material, ductility may be high. As a preferred embodiment of the metal layer, an aluminum layer may be provided. The outer insulating layer and the inner adhesive layer may be formed of polymer materials.

The electrode assembly 130 includes a positive electrode plate, a negative electrode plate, and a separator. The electrode assembly 130 may be provided in such a manner that at least one positive electrode plate and at least one negative electrode plate are arranged with a separator being disposed therebetween. The electrode assembly 130 may be provided in such a manner that a plurality of positive electrode plates and a plurality of negative electrode plates are alternately stacked. Alternatively, the electrode assembly 130 may be provided in such a manner that one positive electrode plate and one negative electrode plate are wound.

The electrode plates of the electrode assembly 130 include a current collector and an active material slurry applied to one or both sides of the current collector. The active material slurry may be formed by agitating a granular active material, an auxiliary conductor, and a binder in a state in which a solvent such as a plasticizer is added thereto. Each of the electrode plates may include a non-coated portion that is a region to which the active material slurry is not applied. The electrode tab 150 corresponding to each electrode plate may be formed on the non-coated portion.

The electrode tab 150 extends from the electrode assembly 130 in a protruding shape. The electrode tab 150 includes a positive electrode tab 151 and a negative electrode tab 153. The positive electrode tab 151 may extend from the non-coated portion of the positive electrode plate, and the negative electrode tab 153 may extend from the non-coated portion of the negative electrode plate.

One positive electrode tab 151 and one negative electrode tab 153 may be provided on the battery cell 100. Alternatively, a plurality of positive electrode tabs 151 and a plurality of negative electrode tabs 153 may be provided. For example, if the electrode assembly 130 of the battery cell 100 includes only one positive electrode plate and one negative electrode plate, one positive electrode tab 151 and one negative electrode tab 153 may be provided. Alternatively, a plurality of positive electrode tabs 151 and negative electrode tabs 153 may be provided. If the electrode assembly 130 includes a plurality of positive electrode plates and a plurality of negative electrode plates, a plurality of positive electrode tabs 151 and a plurality of negative electrode tabs 153 may also be included in the electrode assembly 130 such that each electrode plate may be provided with an electrode tab 150.

The electrode lead 170 may electrically connect the battery cell 100 to other external devices. The electrode lead 170 may include a positive electrode lead 171 and a negative electrode lead 173. The electrode lead 170 may extend from the inside to the outside of the pouch case 110. A region of the electrode lead 170 may be placed between the sealing portions S. The electrode lead 170 is connected to the electrode tab 150.

Figure 3:
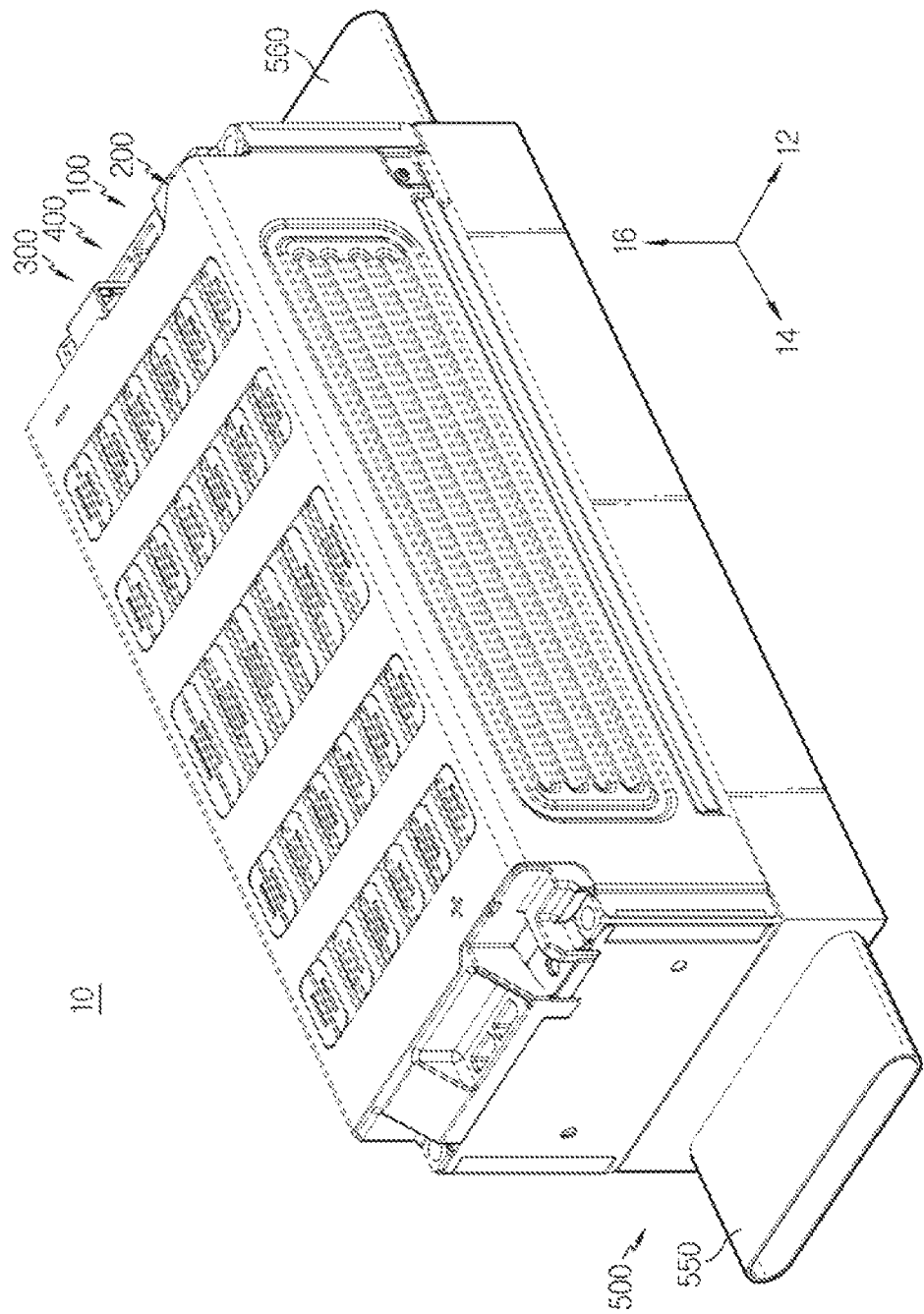
FIG. 3 is a perspective view illustrating a battery module according to an embodiment of the present disclosure.
Figure 4:
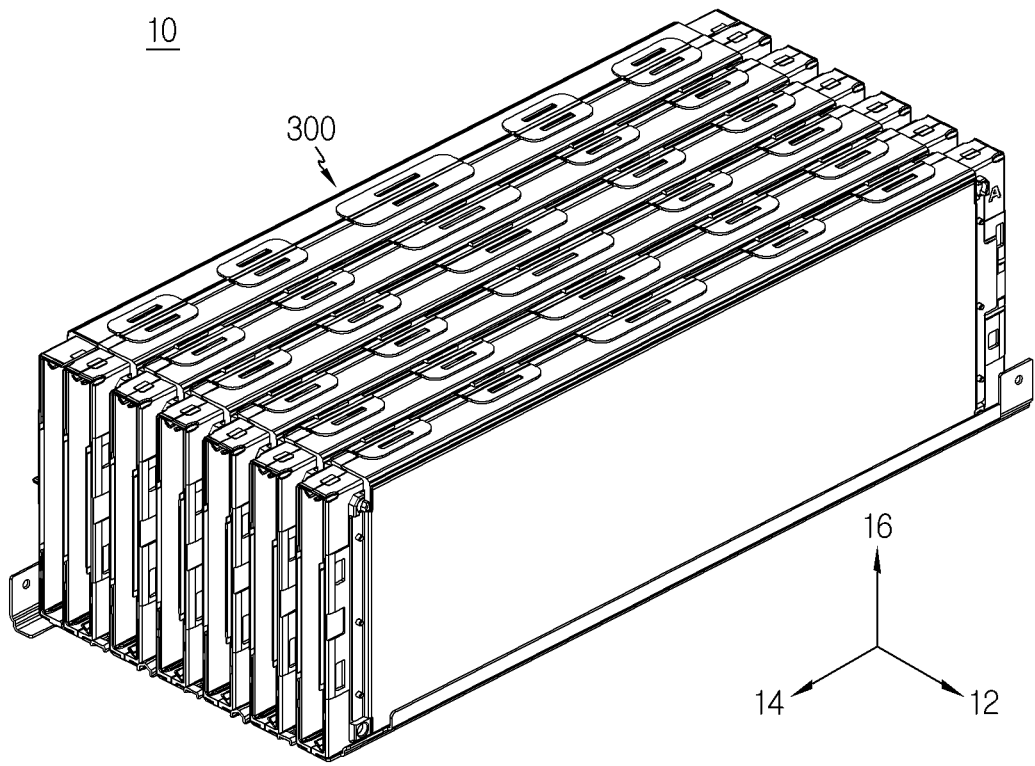
FIG. 4 is a perspective view illustrating a state in which a plurality of cartridges illustrated in FIG. 3 are stacked.
Figure 5:
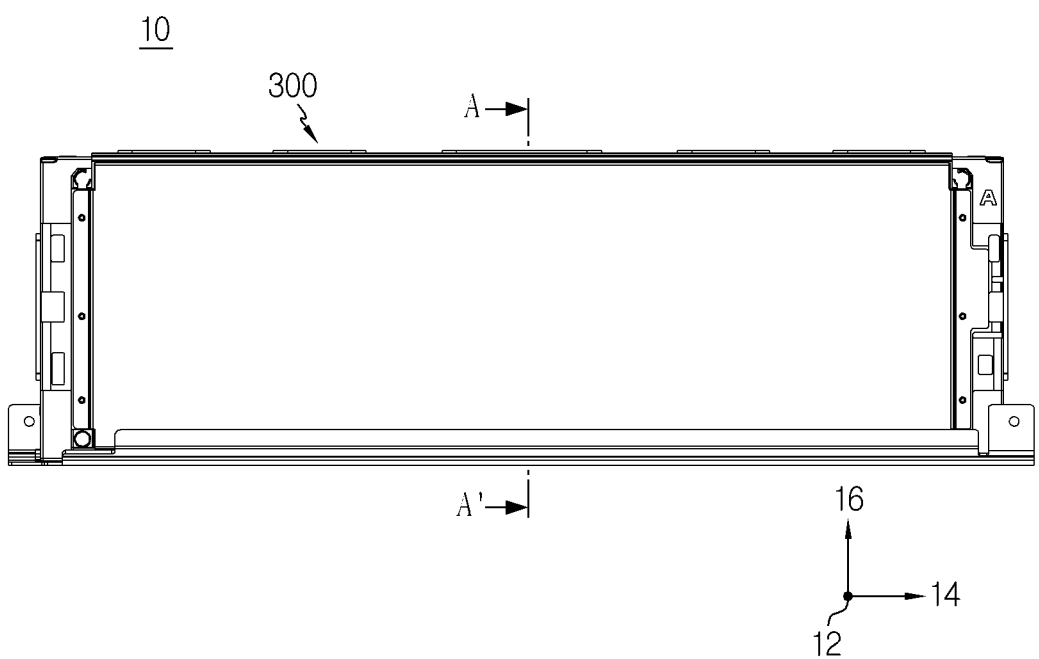
FIG. 5 is a front view of FIG. 3.

Hereinafter, a battery module 10 will be described according to an embodiment of the present disclosure. FIG. 3 is a perspective view illustrating a battery module according to an embodiment of the present disclosure, FIG. 4 is a perspective view illustrating a stacked state of a plurality of cartridges of FIG. 3, and FIG. 5 is a front view of FIG. 3. Referring to FIGS. 3 to 5, the battery module 10 includes a plurality of battery cells 100. The battery module 10 includes the battery cells 100, a case 200, the cartridges 300, a cooling unit 400, and a heat exchange unit 500.

The battery module 10 is formed by stacking the cartridges 300 in which the plurality of battery cells 100 are accommodated. Hereinafter, a direction in which the plurality of battery cells 100 are stacked is referred to as a first direction 12, a direction perpendicular to the first direction 12 when viewed from above is referred to as a second direction 14, and a direction perpendicular to both the first direction 12 and the second direction 14 is referred to as a third direction 16.

The installed battery cells 100 are the same as the above-described battery cell 100.

The case 200 has an inner space. The plurality of cartridges 300 are placed in the inner space of the case 200. The case 200 has a substantially rectangular parallelepiped shape. The case 200 may protect the battery cells 100 disposed therein from external impact.

Each of the cartridges 300 has an accommodation space therein. A plurality of battery cells 100 are placed in the accommodation space. In the embodiment of the present disclosure, two battery cells 100 may be accommodated in the accommodation space. Alternatively, three or more battery cells 100 may be accommodated in the accommodation space.

The cartridges 300 may have a rectangular shape when viewed in the first direction 12. The cartridges 300 may be provided in the form of a frame having a space therein. The cartridges 300 may support the battery cells 100 on both sides.

A plurality of cartridges 300 may be provided. The plurality of cartridges 300 are stacked in the first direction 12. The plurality of cartridges 300 may be placed in the inner space of the case 200.

Figure 6:
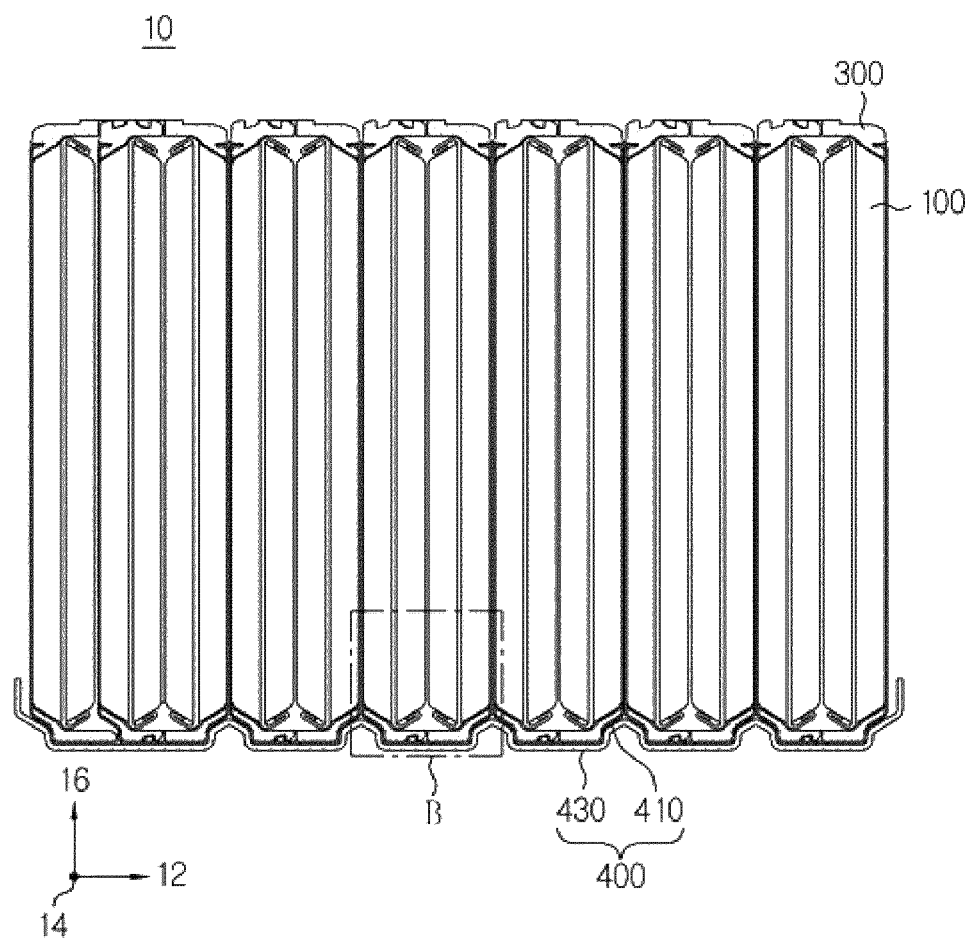
FIG. 6 is a cross-sectional view illustrating the battery module according to an embodiment of the present disclosure.
Figure 7:
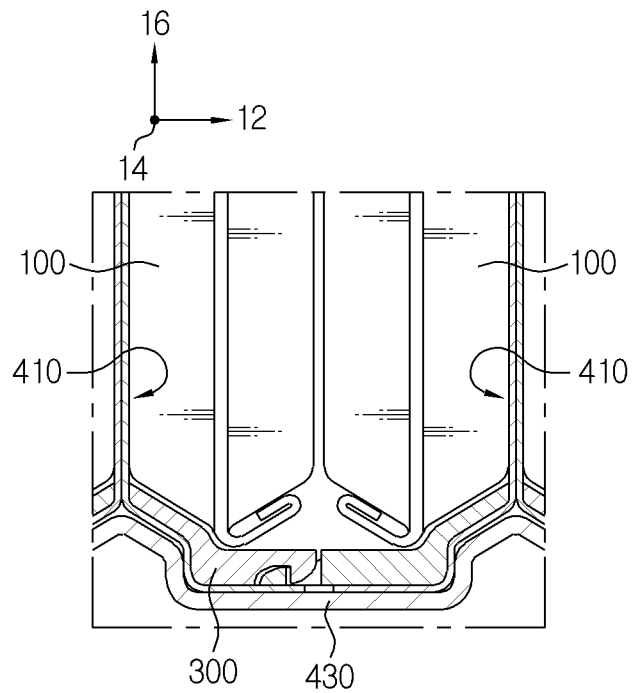
FIG. 7 is an enlarged view illustrating a region B of FIG. 6.

FIG. 6 is a cross-sectional view illustrating the battery module according to an embodiment of the present disclosure, and FIG. 7 is an enlarged view illustrating a region B of FIG. 6. Referring to FIGS. 6 to 7, the cooling unit 400 may cool the battery cells 100. The cooling unit 400 is in contact with the battery cells 100 and may cool the battery cells 100 in such a manner that heat from the battery cells 100 are sequentially transferred to a cooling fin 410, a cooling plate 430, and the heat exchange unit 500.

The cooling unit 400 includes the cooling fin 410 and the cooling plate 430.

The cooling fin 410 transfers heat from a battery cell 100 to the cooling plate 430. The cooling fin 410 is in contact with a side of the battery cell 100. The cooling tin 410 and the battery cell 100 are in surface contact with each other. A plurality of cooling tins 410 are provided. The plurality of battery cells 100 and the plurality of cooling tins 410 are arranged in the first direction 12 in the order of a cooling fin 410, a battery cell 100, a battery cell 100, and a cooling fin 410, and arrangement in this order is repeated in the first direction 12. The cooling fins 410 may be formed of a metallic material. For example, the cooling fins 410 may be formed of an aluminum material. Alternatively, the cooling fins 410 may be formed of another metallic material having high thermal conductivity.

The cartridges 300 are placed on upper surfaces of the cooling fins 410 in the third direction 16. A surface of each of the cooling fins 410 may be in contact with cartridges 300.

The cooling fins 410 have a bent shape in lower portions in the third direction 16. Bent portions of the cooling fins 410 may be directed toward the battery cells 100. For example, the cooling fins 410 may be bent in a direction toward the battery cells 100 as shown in FIG. 7. The bent directions of the bent portions of the cooling fins 410 are inclined downward in the third direction 16. Sides of the bent portions of the cooling fins 410 are in contact with the cartridges 300. The bent portions of the cooling fins 410 are located under the cartridges 300 in the third direction 16. Portions of the cartridges 300 making contact with the bent portions of the cooling fins 410 may have a shape corresponding to the bent portions of the cooling fins 410.

The cooling plate 430 may transfer heat from the battery cells 100 to the outside or the heat exchange unit 500. The cooling plate 430 is placed under the cooling fins 410. The cooling plate 430 may be in contact with the plurality of cooling fins 410. For example, the cooling plate 430 may be formed of an aluminum material. Alternatively, the cooling plate 430 may be formed of another metallic material having high thermal conductivity.

In the third direction 16, an upper surface of the cooling plate 430 is in contact with the cooling tins 410, and the other surface of the cooling plate 430 is in contact with the heat exchange unit 500. The cooling plate 430 has bent portions. The bent portions of the cooling plate 430 are in contact with the bent portions of the cooling fins 410. The bent directions of the bent portions of the cooling plate 430 are inclined downward in the third direction 16. The number of the bent portions of the cooling plate 430 corresponds to the number of the bent portions of the cooling fins 410.

Referring to FIG. 7, the bent portion formed on each of the cooling fins 410 has a shape corresponding to the shape of a portion of the cooling plate 430 bent together with the cooling fin 410. The number of the bent portions of the cooling plate 430 corresponds to the number of the bent portions of the cooling fins 410. Referring to the single cartridge 300 shown in FIG. 7 as a reference, one cartridge 300 includes two battery cells 100. Cooling fins 410 are placed on both sides of each of the battery cells 100 in the first direction 12. Each of the cooling fins 410 includes a bent portion which is bent downward in the third direction 16. A bent portion of the cooling plate 430 is placed below the bent portion of each of the cooling fins 410 in the third direction 16. The cooling plate 430 has a flat shape as a whole between the bent portions of the cooling plate 430. Referring to FIG. 7, the cooling plate 430 located below one cartridge 300 in the third direction 16 has a flat center portion, bent portions on both sides thereof in the first direction 12, and a space formed therein to accommodate sides of battery cells 100.

Figure 8:
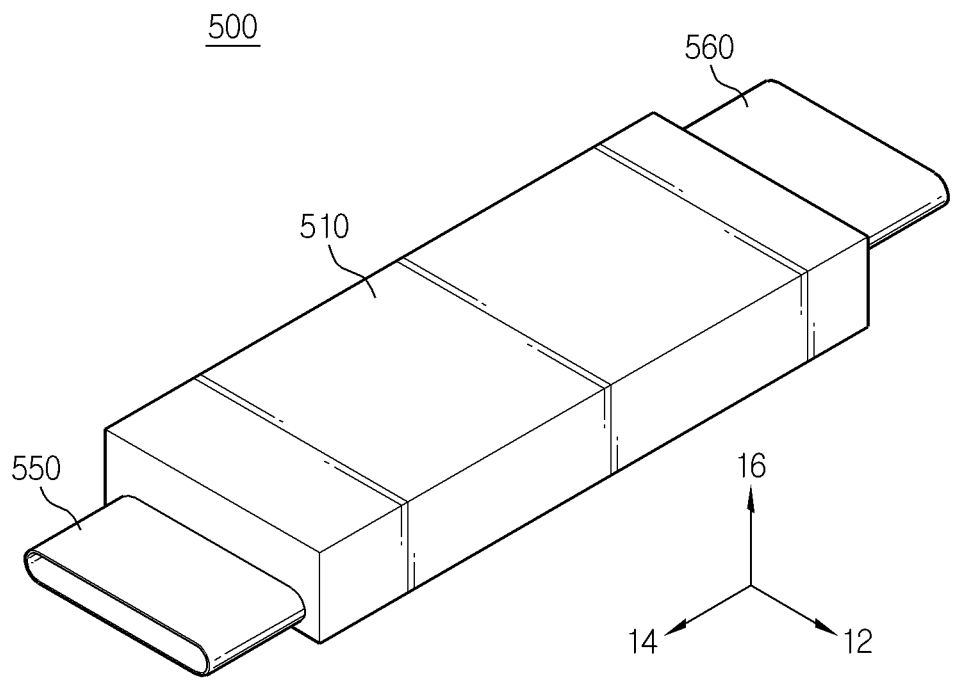
FIG. 8 is a perspective view illustrating a heat exchange unit of FIG. 3.
Figure 9:
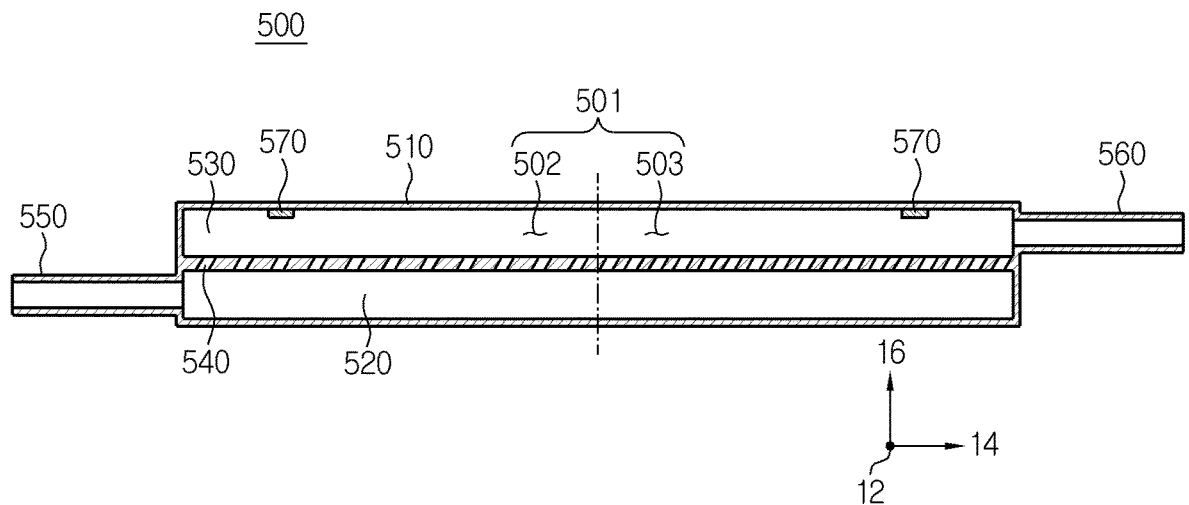
FIG. 9 is a cross-sectional view illustrating the heat exchange unit of FIG. 3.

FIG. 8 is a perspective view illustrating the heat exchange unit 500 of FIG. 3, and FIG. 9 is a cross-sectional view illustrating the heat exchange unit 500 of FIG. 3. Referring to FIGS. 8 and 9, the heat exchange unit 500 is in contact with the cooling plate 430 and may exchange heat with the cooling plate 430. The heat exchange unit 500 may cool the cooling plate 430. The heat exchange unit 500 includes a supply pipe 550, a heat exchange chamber 510, a discharge pipe 560, and a temperature measuring member 570.

The supply pipe 550, the heat exchange chamber 510, and the discharge pipe 560 are arranged side by side in the second direction 14. A supply pipe 550 supplies a cooling fluid to the heat exchange chamber 510. For example, the cooling fluid may be cooling water. Alternatively, the cooling fluid may be another fluid having high heat capacity.

The supply pipe 550 is coupled to a side of the heat exchange chamber 510 in the second direction 14. The supply pipe 550 is connected to a lower cooling flow path 520 (described later) to supply the cooling fluid to the lower cooling flow path 520.

The heat exchange chamber 510 includes an inner flow path through which the cooling fluid flows. The heat exchange chamber 510 has an inner space. The heat exchange chamber 510 may have a rectangular parallelepiped shape. The area of a surface of the heat exchange chamber 510 making contact with the cooling plate 430 may be larger than the area of the cooling plate 430. The heat exchange chamber 510 may be formed of a metallic material. For example, the heat exchange chamber 510 may be formed of an aluminum material. Alternatively, the heat exchange chamber 510 may be formed of a metallic material having high thermal conductivity.

A cooling flow path through which the cooling fluid flows is provided inside the heat exchange chamber 510. The cooling flow path includes a lower cooling flow path 520, an upper cooling flow path 530, and a connection flow path 540.

The lower cooling flow path 520 is located in a lower region of the inner space 501 in the third direction 16. The lower cooling flow path 520 has a rectangular shape when viewed in the third direction 16. The cooling fluid supplied from the supply pipe 550 flows in the lower cooling flow path 520.

The upper cooling flow path 530 is located in an upper region of the inner space 501 in the third direction 16. The upper cooling flow path 530 is located above the lower cooling flow path 520. The cooling fluid supplied from the lower cooling flow path 520 flows through the upper cooling flow path 530. The cooling fluid flowing in the upper cooling flow path 530 may exchange heat with the cooling plate 430. After the cooling fluid flowing in the upper cooling flow path 530 exchanges heat with the cooling plate 430, the cooling fluid is discharged to the outside through the discharge pipe 560. The upper cooling flow path 530 has a rectangular shape when viewed in the third direction 16. The upper cooling flow path 530 may have the same area as the lower cooling flow path 520. The area of the upper cooling flow path 530 may be larger than the area of the cooling plate 430.

The connection flow path 540 is connected to the lower cooling flow path 520 and the upper cooling flow path 530. The connection flow path 540 supplies the cooling fluid flowing in the lower cooling flow path 520 to the upper cooling flow path 530. A plurality of connection flow paths 540 are provided. The connection flow paths 540 adjacent to each other are spaced a predetermined distance apart from each other in the inner space 501 of the heat exchange chamber 510. The connection flow paths 540 branch off from the lower cooling flow path 520. The connection flow paths 540 are inclined upward with respect to a direction in which the cooling fluid flows. The connection flow paths 540 are inclined upward, and the cooling fluid may be supplied to the upper cooling flow path 530 without using a separate power source.

The inner space 501 of the heat exchange chamber 510 has an upstream region 502 and a downstream region 503. Here, the upstream region 502 corresponds to a region of the inner space 501 of the heat exchange chamber 510 adjacent to the supply pipe 550, and the downstream region 503 corresponds to a region of the inner space 501 of the heat exchange chamber 510 adjacent to the discharge pipe 560.

The number of connection flow paths 540 located in the downstream region 503 may be greater than the number of connection flow paths 540 located in the upstream region 502. For example, the number of connection flow paths 540 in the downstream region 503 may be twice the number of connection flow paths 540 in the upstream region 502. Alternatively, the number of connection flow paths 540 may gradually increase in a direction from the upstream region 502 to the downstream region 503.

The discharge pipe 560 is connected to the upper cooling flow path 530 to discharge the cooling fluid from the upper cooling flow path 530 to the outside. The discharge pipe 560 is coupled to a side of the heat exchange chamber 510 in the second direction 14. The discharge pipe 560 is located facing the supply pipe 550. The discharge pipe 560 is located higher than the supply pipe 550. For example, as shown in FIG. 9, the discharge pipe 560 is located higher than the supply pipe 550 in the third direction 16.

The temperature measuring member 570 measures the temperature of the cooling fluid flowing through the upper cooling flow path 530. The temperature measuring member 570 is placed in the inner space 501 of the heat exchange chamber 510. For example, the temperature measuring member 570 may be placed in an upper region of the upper cooling flow path 530. A plurality of temperature measuring members 570 may be provided. The temperature measuring member 570 measures the temperature of the cooling fluid, and if the temperature is outside a preset temperature range, the temperature measuring member 570 may inform a controller (not shown) of that information. If the temperature measured by the temperature measuring member 570 is higher than the preset temperature range, the controller may detect that the battery module 10 has an abnormal temperature and may report that information.

A battery pack of the present disclosure includes at least one such battery module 10 as described above. The battery pack may further include, in addition to the battery module 10, a case configured to accommodate the battery module 10 and other various devices configured to control charging and discharging operations of the battery module 10. For example, the battery pack may further include a battery management system (BMS), a current sensor, a fuse, or the like.

A battery pack including a plurality of battery modules 10 of the present disclosure may be applied to a vehicle such as an electric vehicle or a hybrid vehicle. A vehicle of the present disclosure may include a battery pack of the present disclosure, and the battery module 10 of the present disclosure may be included in the battery pack.

Figure 10:
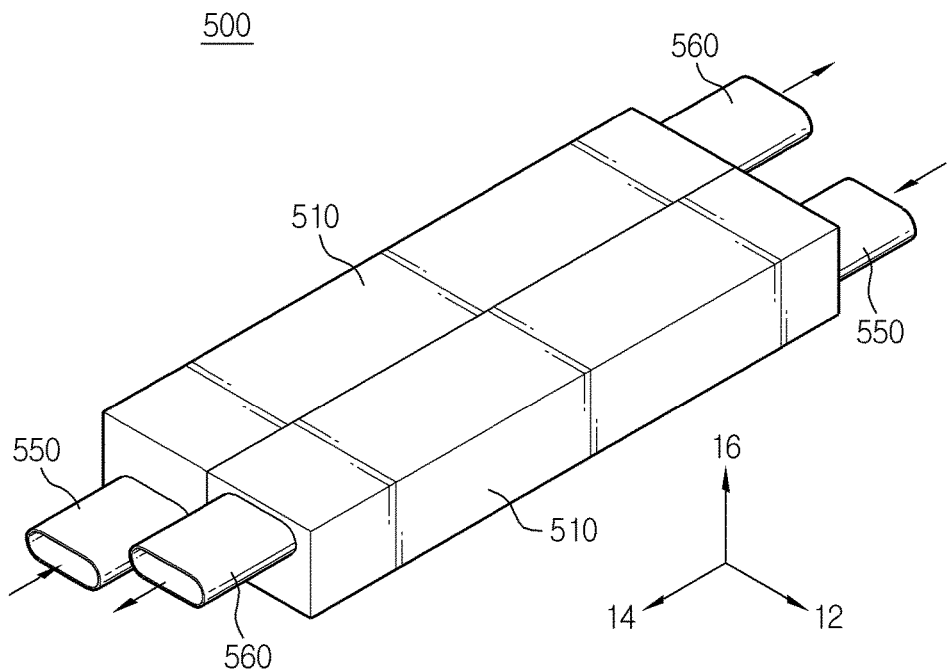
FIGS. 10 and 11 are perspective views illustrating heat exchange units according to other embodiments of the present disclosure.
Figure 11:
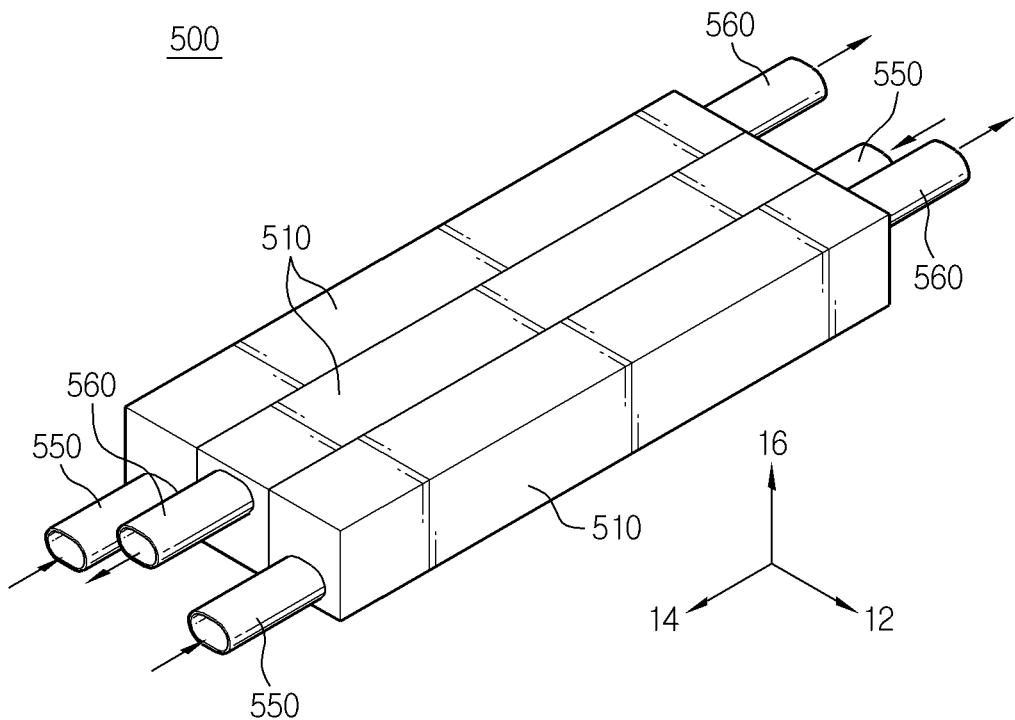

In the above example, one heat exchange unit 500 is provided. However, two heat exchange units 500 may be provided as illustrated in FIG. 10 or three heat exchange units 500 may be provided as illustrated in FIG. 10. In these cases, the heat exchange units 500 have the same internal structure as the above-described heat exchange unit 500. However, supply pipes 550 of adjacent heat exchange units 500 are positioned facing each other in the second direction 14. That is, adjacent heat exchange units 500 may be positioned in the opposite directions based on heat exchange chambers 510. When a plurality of heat exchange units 500 are provided, it may be possible to improve the problem in that cooling efficiency is lowered at a downstream side of a cooling flow path through which a cooling fluid flows. More detailed effects will be described later.

Hereinafter, the cooling effect of a battery cell 100 provided in a battery module 10 will be described according to an embodiment of the present disclosure.

Figure 12:
FIG. 12 is a graph schematically illustrating variations in the inside temperature of a heat exchange chamber.
Figure 13:
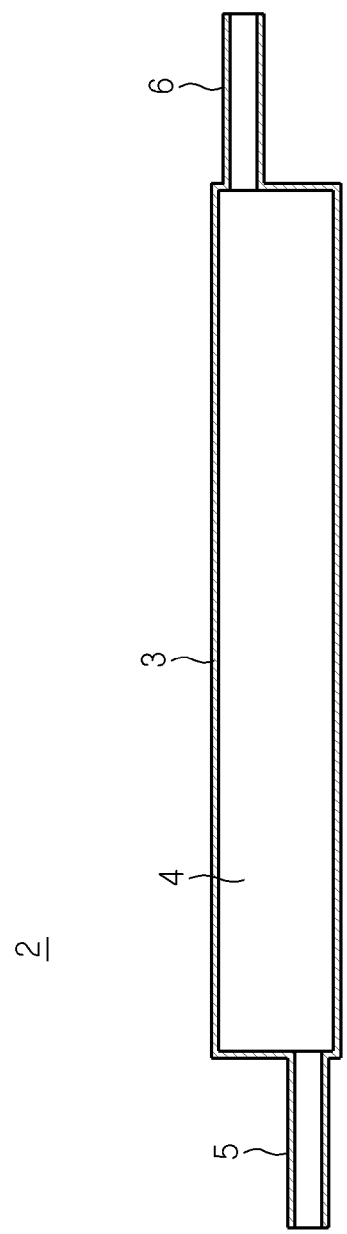
FIG. 13 is a cross-sectional view illustrating a heat exchange unit having a single flow path formed in a heat exchange chamber.

FIG. 12 is a graph schematically illustrating variations in the inside temperature of a heat exchange chamber, and FIG. 13 is a cross-sectional view illustrating a heat exchange unit 2 including a heat exchange chamber in which a single flow path is formed.

Referring to FIG. 13, a single flow path 4 is formed in a normal heat exchange chamber 3. A supply pipe 5 supplies a cooling fluid to the heat exchange chamber 3. The cooling fluid supplied to the heat exchange chamber 3 flows through the single flow path 4. The cooling fluid is discharged to the outside from the heat exchange chamber 3 through a discharge pipe 6. At this time, in the single flow path 4 formed in the heat exchange chamber 3, the cooling fluid flows from upstream to downstream. In this process, the cooling fluid that has exchanged heat with a cooling plate at an upstream side increases in temperature in a direction toward a downstream side. Since the single flow path 4 is only formed as a cooling flow path, the temperature of the entire cooling fluid increases in a downstream direction. In this case, since the amount of heat exchange with the cooling plate is relatively small at a downstream side, the cooling efficiency of a battery cell located above the downstream side of the cooling flow path is lowered. In addition, the cooling fluid flowing in a lower region of the cooling flow path does not make direct contact with the cooling plate and thus can not participate in heat exchange.

However, the flow path formed in the heat exchange unit 500 of the present disclosure is divided into the upper cooling flow path 530 and the lower cooling flow path 520. The cooling plate 430 may exchange heat with a cooling fluid flowing in the upper cooling flow path 530. At this time, as it goes downstream, the upper cooling flow path 530 is supplied with the cooling fluid that has not participated in heat exchange from a lower side through the connection flow paths 540, and thus the cooling efficiency of the upper cooling flow path 530 may be improved at a downstream side. In addition, the cooling fluid flowing in a lower region of the heat exchange chamber 510 may also make direct contact with the cooling plate 430 and exchange heat with the cooling plate 430. That is, the entire cooling fluid supplied through the supply pipe 550 may participate in heat exchange, thereby improving the efficiency of cooling. In addition, more connection flow paths 540 may be provided in the downstream region 503 than in the upstream region 502 so as to supply a larger amount of the cooling fluid from the lower cooling flow path 520 in the downstream region 503 and thus maximize the cooling efficiency of the battery cells 100.

FIG. 12 is a graph schematically illustrating the temperature of a cooling fluid flowing through the upper cooling flow path. The horizontal axis L of the graph indicates a length from an upstream side to a downstream side of the heat exchange chamber 510. The vertical axis T of the graph shows the temperature of the cooling fluid flowing through the upper cooling flow path 530. Referring to the graph of FIG. 12, it may be confirmed that the temperature of the upper cooling flow path 530 is maintained at a constant level T1 owing to the connection flow paths 540.

In addition, a battery module 10 according to another embodiment of the present disclosure may include a plurality of heat exchange units 500. In this case, supply pipes 550 of adjacent heat exchange units 500 are positioned in opposite directions. A cooling fluid may be supplied to the heat exchange units 500 in opposite directions so as to further increase the efficiency of cooling, compared to the case of using a single heat exchange unit 500.

As described above, the battery module 10 of the present disclosure includes the heat exchange unit 500 having the upper cooling flow path 530, the lower cooling flow path 520, and the connection flow paths 540, thereby improving the cooling efficiency of the battery cells 100.

The foregoing detailed description illustrates examples of the present disclosure. In addition, the foregoing is intended to illustrate and explain preferred embodiments of the present disclosure, and the present disclosure may be used in various other combinations, modifications, and environments. That is, changes or corrections may be made within the scope of the inventive concept disclosed in the present specification, a range equivalent to the foregoing description, and/or the range of technology or knowledge of the related art. The foregoing embodiments are for illustrating the best mode for implementing the technical idea of the present disclosure, and various modifications may be made therefrom according to specific application fields and uses of the present disclosure. Therefore, the foregoing detailed description of the present disclosure is not intended to limit the inventive concept to the disclosed embodiments. It is also to be understood that the appended claims are intended to cover further embodiments.

What is claimed is:

1. A battery module comprising:
   a cartridge comprising an accommodation space therein;
   a plurality of battery cells placed in the accommodation space;
   a cooling unit configured to cool the battery cells; and
   a heat exchange unit configured to exchange heat with the cooling unit,
   wherein the cooling unit comprises:
      a cooling fin making surface contact with sides of the battery cells; and
      a cooling plate making contact with the cooling fin,
   wherein the heat exchange unit comprises:
      a heat exchange chamber comprising an inner space;
      a lower cooling flow path located in the heat exchange chamber and through which a cooling fluid flows;
      a supply pipe configured to supply the cooling fluid to the lower cooling flow path;
      an upper cooling flow path located above the lower cooling flow path and through which the cooling fluid supplied from the lower cooling flow path flows;
      a discharge pipe configured to discharge the cooling fluid outward from the upper cooling flow path; and
      a plurality of connection flow paths configured to supply the cooling fluid flowing in the lower cooling flow path to the upper cooling flow path,
   wherein the inner space of the heat exchange chamber comprises an upstream region adjacent to the supply pipe and a downstream region adjacent to the discharge pipe,
   wherein the upstream region includes a portion of each of the lower flow path and the upper flow path and the downstream region includes a remainder of each of the lower flow path and the upper flow path, and
   wherein the number of connection flow paths located in the downstream region is greater than the number of connection flow paths located in the upstream region such that the connection flow paths in the downstream region are closer to each other than the connection flow paths in the upstream region are to each other, and the number of connection flow paths in the upstream region is at least one.

2. The battery module of claim 1, wherein the connection flow paths branch off from the lower cooling flow path and are inclined upward at an angle of less than 90 degrees along a direction in which the cooling fluid flows.

3. The battery module of claim 2, wherein an area of the upper cooling flow path is greater than an area of the cooling plate.

4. The battery module of claim 3, wherein the upper cooling flow path and the lower cooling flow path have the same area.

5. The battery module of claim 2, wherein the heat exchange unit comprises a plurality of heat exchange units, and
   supply pipes of the heat exchange units adjacent to each other are positioned in opposite directions with respect to the heat exchange chamber.

6. The battery module of claim 1, wherein the discharge pipe is located higher than the supply pipe.

7. The battery module of claim 1, wherein the heat exchange unit further comprises a temperature measuring member configured to inspect a temperature of the cooling fluid in the upper cooling flow path and the lower cooling flow path.

8. A battery pack comprising the battery module of claim 1.

9. A vehicle comprising the battery pack of claim 8.

10. The battery module of claim 1, wherein the plurality of connection flow paths are arranged in a single plane.

11. The battery module of claim 1, wherein the heat exchange unit includes a single planar member dividing the inner space into the lower flow path and the upper flow path, and the plurality of flow paths are provided in the single planar member.

12. The battery module of claim 1, wherein the upstream region directly contacts the cooling unit.

* * * * *